United States Patent
Yamamoto et al.

(10) Patent No.: US 8,927,667 B2
(45) Date of Patent: Jan. 6, 2015

(54) FLUOROSILICONES AND FLUORINE- AND SILICON-CONTAINING SURFACE TREATMENT AGENT

(75) Inventors: Ikuo Yamamoto, Settsu (JP); Tetsuya Masutani, Settsu (JP); Shinichi Minami, Settsu (JP); Peter Cheshire Hupfield, Trevaughan (GB); Avril E. Surgenor, South Glamorgan (GB); Samantha Reed, South Glamorgan (GB)

(73) Assignees: Daikin Industries, Ltd., Osaka (JP); Dow Corning Corporation, Midland, MI (US)

( * ) Notice: Subject to any disclaimer, the term of this patent is extended or adjusted under 35 U.S.C. 154(b) by 726 days.

(21) Appl. No.: 12/866,074

(22) PCT Filed: Feb. 4, 2009

(86) PCT No.: PCT/JP2009/052251
§ 371 (c)(1),
(2), (4) Date: Nov. 5, 2010

(87) PCT Pub. No.: WO2009/099241
PCT Pub. Date: Aug. 13, 2009

(65) Prior Publication Data
US 2011/0057142 A1    Mar. 10, 2011

Related U.S. Application Data

(60) Provisional application No. 61/026,578, filed on Feb. 6, 2008.

(51) Int. Cl.
C08F 283/12    (2006.01)
C08F 18/20    (2006.01)

(52) U.S. Cl.
USPC ............................ 526/245; 523/107

(58) Field of Classification Search
USPC ............................ 526/245; 523/107
See application file for complete search history.

(56) References Cited

U.S. PATENT DOCUMENTS

| 4,070,152 A |   | 1/1978  | Pentz |         |
|-------------|---|---------|-------|---------|
| 4,366,300 A | * | 12/1982 | Delescluse | 526/245 |
| 4,592,930 A | * | 6/1986  | Schmidt et al. | 427/133 |

(Continued)

FOREIGN PATENT DOCUMENTS

| EP | 0247489 A2 | 12/1987 |
| EP | 0333083 A2 | 9/1989 |

(Continued)

OTHER PUBLICATIONS

Maekawa, Takashige, "Fluorine-containing Surface Modifying Agents", Fine Chemical, vol. 23, No. 6, 1994, pp. 12-25.

(Continued)

*Primary Examiner* — Peter D. Mulcahy
*Assistant Examiner* — Henry Hu
(74) *Attorney, Agent, or Firm* — Dinsmore & Shohl LLP

(57) ABSTRACT

A fluorosilicone reaction product of a vinyl functional organopolysiloxane and a fluorine-containing monomer, and methods of preparing the fluorosilicone are disclosed. The fluorosilicone products are suitable for application to substrates such as textiles, particularly fabrics, to impart oil repellent properties to the textile. The fluorosilicone reaction product is prepared from (A) a fluorine-containing monomer of the formula $CH_2=C(X)COOYRf$, and (B) a vinyl functional organopolysiloxane.

18 Claims, No Drawings

(56) References Cited

U.S. PATENT DOCUMENTS

| | | | |
|---|---|---|---|
| 5,068,295 A | 11/1991 | Misaizu et al. | |
| 5,128,389 A * | 7/1992 | Inukai et al. | 522/172 |
| 5,247,008 A | 9/1993 | Michels et al. | |
| 5,536,304 A | 7/1996 | Coppens et al. | |
| 5,883,067 A | 3/1999 | Kubo et al. | |
| 5,883,185 A | 3/1999 | Matsumura et al. | |
| 6,037,429 A * | 3/2000 | Linert et al. | 526/243 |
| 6,472,019 B1 | 10/2002 | Yamaguchi et al. | |
| 6,582,620 B2 | 6/2003 | Miyadai et al. | |
| 2006/0134439 A1 | 6/2006 | Yamamoto et al. | |
| 2006/0205864 A1 | 9/2006 | Yamamoto et al. | |
| 2012/0046382 A1* | 2/2012 | Zhou et al. | 523/107 |
| 2013/0078880 A1* | 3/2013 | Uesugi et al. | 442/80 |

FOREIGN PATENT DOCUMENTS

| | | | |
|---|---|---|---|
| EP | 0383310 A2 | | 8/1990 |
| EP | 0609456 | | 8/1994 |
| EP | 0777009 A2 | | 6/1997 |
| EP | 1097958 A1 | | 5/2001 |
| EP | 1652901 A1 | | 5/2006 |
| JP | 58042682 | | 3/1983 |
| JP | 60-190408 | * | 9/1985 |
| JP | 60190408 | | 9/1985 |
| JP | 63090588 A | | 4/1988 |
| JP | 63099285 A | | 4/1988 |
| JP | 63075082 | | 5/1988 |
| JP | EP-327906 A1 | * | 8/1989 |
| JP | 01315471 A | | 12/1989 |
| JP | 02214791 A | | 8/1990 |
| JP | 03231986 | | 10/1991 |
| JP | 09143877 A | | 6/1997 |
| JP | 09324173 | | 12/1997 |
| WO | 2004069935 A1 | | 8/2004 |
| WO | 2004069955 A1 | | 8/2004 |
| WO | 2004096939 A1 | | 11/2004 |
| WO | 2004108855 A1 | | 12/2004 |
| WO | 2006121171 A1 | | 11/2006 |
| WO | WO-2006/121171 A1 | * | 11/2006 |
| WO | 2007127267 A2 | | 11/2007 |
| WO | WO-2007/127267 A2 | * | 11/2007 |

OTHER PUBLICATIONS

International Search Report and Written Opinion dated Mar. 30, 2009 pertaining to International application No. PCT/JP2009/052251.

* cited by examiner

FLUOROSILICONES AND FLUORINE- AND SILICON-CONTAINING SURFACE TREATMENT AGENT

CROSS-REFERENCE TO RELATED APPLICATIONS

This application claims benefit under 35 U.S.C. §119(e) of U.S. Provisional Application No. 61/026,578 filed Feb. 6, 2008, incorporated herein by reference in its entirety.

TECHNICAL FIELD

This invention relates to a fluorosilicone reaction product of a vinyl functional organopolysiloxane and a fluorine-containing monomer, and methods of preparing the fluorosilicone. The fluorosilicone products are suitable for application to substrates such as textiles, particularly fabrics, to impart oil repellent properties (oleophobicity) to the textile.

The fluorosilicone reaction product (that is, a fluorine- and silicon-containing polymer) is useful for a surface treatment agent imparting excellent water repellency, oil repellency, soil resistance, and feeling to a substrate such as a textile.

BACKGROUND ARTS

Fluorocarbon polymers are extensively used in the textile industry to impart oleophobicity/oil repellency to a fabric. For example, U.S. Pat. No. 5,247,008 describes finishing agents for textiles, leather, paper and mineral substrates which are aqueous dispersions of a copolymer of a perfluoroalkyl acrylate or methacrylate, an alkyl acrylate or methacrylate and an aminoalkyl acrylate or methacrylate.

U.S. Pat. No. 5,068,295 describes a water and oil repellent comprising a copolymer of a perfluoroalkyl acrylate or methacrylate, a polyorganosiloxane containing a vinyl group and a vinyl monomer containing an isocyanate or blocked isocyanate group.

U.S. Pat. No. 6,582,620 and U.S. Pat. No. 5,883,185 describe a treating composition for textiles to render them water and oil repellent obtained by cohydrolysis and condensation of (A) a fluorinated alkyl-bearing alkoxysilane, (B) an amino-bearing alkoxysilane, and (C) an alkoxysilyl-bearing polyorganosiloxane.

U.S. Pat. No. 5,536,304 describes application of a blend of a succinic anhydride-terminated polydimethylsiloxane and a poly(fluoroalkyl methacrylate) to cotton to give a fabric with oil repellency.

U.S. Pat. No. 6,472,019 describes treating a textile with a water- and oil-repellent agent comprising a fluorine-containing polymer and a sulphated fatty acid compound and WO 2004/069935 and WO 2004/069955 describe a fluorine containing polymer delivered as an aqueous dispersion for textile treatment.

One of the major disadvantages of topical finishes prepared with fluorocarbon polymers is that they impart a harsh feel to the fabric surface. There is a need for textile treatment agents which impart oleophobicity and oil repellency to fabrics without imparting a harsh feel to the fabric surface, and preferably whilst at the same time imparting an improvement in feel compared to untreated fabric.

Hitherto, in order to give both water- and oil-repellency and softness to a substrate such as a textile, a water- and oil-repellent composition comprising a perfluoroalkyl group giving water- and oil-repellency and a silicone compound giving softness has been widely used. Please see, for example, JP-A-58-42682, JP-A-60-190408, JP-A-63-075082, JP-A-09-143877, and U.S. Pat. No. 4,070,152.

There is, for example, a method of using a copolymer of a fluorine-containing acrylate monomer and a silicone acrylate monomer for the same purpose (for example, JP-A-02-214791 and JP-A-03-231986). This method, however, has the problem that the water- and oil-repellency is decreased.

By the way, the fluoroacrylate polymer used as the conventional surface treatment agent needs at least 8 carbon atoms in the fluoroalkyl group so as to give sufficient water- and oil-repellency. Since said fluoroacrylate polymer has high hydrophobicity, in the case of emulsion polymerization, there are necessity that the amount of the used emulsifier is large, the problem that the type of the emulsifier is limited, and the necessity that an aid solvent should be used due to poor compatibility with another fluorine-free monomer. In the case of a solution polymerization, there is the problem that the solubility into a polymerization solvent is decreased for the same reason.

Various recent research results indicate that in view of the practical treatment of fibers with the surface treatment agent (particularly the water- and oil-repellent agent), the important surface property is not a static contact angle, but is a dynamic contact angle, particularly a reversing contact angle. That is, the advancing contact angle of water is not dependent on the carbon number of the fluoroalkyl side chain, but the reversing contact angle of water in the case of carbon number of at most 7 is remarkably low than that in the case of carbon number of at least 8. In correspondence to this, an X ray analysis shows that the side chain crystallizes when the carbon number of side chain is at least 7. It is known that the actual water repellency has relationship with the crystallization of the side chain and that mobility of the surface treatment agent molecules is an important factor for expression of the actual performances (for example, MAEKAWA Takashige, FINE CHEMICAL, Vol. 23, No. 6, page 12 (1994)). Accordingly, it is believed that the acrylate polymer having low carbon number of fluoroalkyl group in the side chain which is at most 7 (particularly at most 6) has low crystallinity so that the polymer cannot satisfy the actual performances (particularly water repellency).

Hitherto, it is known that the fluorine-containing acrylate polymer having an alpha position substituted with fluorine, chlorine or the like has good adhesion to a substrate, forms a film having a large strength, and imparts good water- and oil-repellency (JP-A-63-90588, JP-A-63-99285 and JP-A-01-315471). These publications also show that the carbon number of the fluoroalkyl group used in working examples is at least 8, and these publications do not think the use of the acrylate monomer having fluoroalkyl group having at most 6 carbon atoms.

It is proposed to use the fluorine-containing acrylate polymer which has the fluoroalkyl group having at most 4 carbon atoms and in which the alpha position is substituted with fluorine, chlorine or the like (for example, WO2004-096939). Since the polymer film, however, is strong, the feeling of the treated textile is problematically deteriorated.

A method of adding a silicone polymer or copolymerizing a silicon-containing monomer is proposed for the fluoroalkyl alkyl group having at most 4 carbon atoms to give both good water- and oil-repellency and feeling (for example, WO2004-108855). The increase of the silicone polymer content, however, problematically decreases the water- and oil-repellency.

Problems to be Solved by the Invention

An object of the present invention is to provide a water- and oil-repellent agent comprising a fluorine-containing acrylate polymer which imparts excellent water- and oil-repellency and soil resistance to a substrate, when the substrate is treated with the water- and oil-repellent agent.

SUMMARY OF THE INVENTION

The present inventors discovered that the above-mentioned object can be achieved by a polymer which is formed from a monomer comprising a fluorine-containing monomer and which is polymerized in the presence of a vinyl functional organopolysiloxane.

The present invention provides a fluorine-containing polymer comprising repeating units derived from a monomer comprising a fluorine-containing monomer, wherein the fluorine-containing polymer has a silicone moiety possessed by a vinyl functional organopolysiloxane.

The present invention also provides a method of producing a fluorine-containing polymer comprising repeating units derived from a monomer comprising a fluorine-containing monomer, wherein the method comprises polymerizing the monomer in the presence of a vinyl functional organopolysiloxane to give the fluorine-containing polymer.

This invention provides a fluorine-containing polymer comprising repeating units derived from:
(A) a monomer which comprises;
  (a) a fluorine-containing monomer of the formula:

$CH_2=C(X)COOYRf$, wherein X is a hydrogen atom, a monovalent organic group, or a halogen atom,
  Y is a direct bond or a divalent organic group, and
  Rf is a fluoroalkyl group having 1 to 21 carbon atoms, and
(B) a vinyl functional organopolysiloxane.

The present invention also provides a method of producing a fluorine-containing polymer comprising
polymerizing:
(A) a monomer which comprises;
  (a) a fluorine-containing monomer of the formula:

$CH_2=C(X)COOYRf$, wherein X is a hydrogen atom, a monovalent organic group, or a halogen atom,
  Y is a direct bond or a divalent organic group, and
  Rf is a fluoroalkyl group having 1 to 21 carbon atoms,
in the presence of;
(B) a vinyl functional organopolysiloxane.

The fluorine-containing polymer (that is, a fluorosilicone product) of the present invention is useful to provide oil repellent properties to a variety of surfaces. When treating textiles, the fluorosilicone of the present invention may also provide a softer hand or feel than conventional fluorocarbon based oil repellent treatments.

Effects of the Invention

According to the present invention, when a substrate is treated, the water- and oil-repellent agent comprising the fluorine-containing acrylate polymer can impart the excellent water- and oil-repellency and soil resistance to the substrate. When the substrate is a textile, the treated textile has good feeling.

MODE FOR CARRYING OUT THE INVENTION

In the present invention, the monomer (A) forming the fluorine-containing polymer comprises:
(a) a fluorine-containing monomer,
(b) optionally present, a fluorine-free monomer other than a crosslinkable monomer, and
(c) optionally present, a crosslinkable monomer.

The fluorine-containing polymer may be a homopolymer formed from one monomer or a copolymer formed from at least two monomers.

The homopolymer has the repeating units derived from the fluorine-containing monomer (a). The copolymer may has the repeating units derived from at least two fluorine-containing monomers (a), or may have, in addition to the repeating units derived from the fluorine-containing monomer (a), the repeating units derived from the fluorine-free monomer (b) and optionally the crosslinkable monomer (c).

The fluorine-containing polymer can be prepared by polymerizing the monomer (A) in the presence of the vinyl functional organopolysiloxane (B).

The fluorine-containing polymer constituting the surface treatment agent of the present invention comprises:
(a) the fluorine-containing monomer, and
optionally (b) the fluorine-free monomer other than the crosslinkable monomer, and
optionally (c) the crosslinkable monomer.
(A) Monomer
(a) Fluorine-Containing Monomer Component (a) of the present invention is a fluorine-containing monomer of the formula:

$CH_2=C(X)COO-Y-Rf$ where Rf is a fluoroalkyl group having 1 to 21 carbon atoms, X is a hydrogen atom, a monovalent organic group, or a halogen atom, and
Y is a direct bond or a divalent organic group. Y may be for example a linear or branched alkylene group having 1 to 20 carbon atoms, for example a group of the formula $-(CH_2)_x-$ where x is 1 to 10, a group of the formula $-SO_2N(R^1)R^2-$ or of the formula $-CON(R^1)R^2-$, where $R^1$ is an alkyl group having 1 to 10 carbon atoms and $R^2$ is a linear or branched alkylene group having 1 to 10 carbon atoms, or a group of the formula $-CH_2CH(OR^3)CH_2-$ where $R^3$ represents a hydrogen atom or an acyl group having 1 to 10 carbon atoms such as formyl or acetyl, or a group of the formula $-Ar-CH_2-$ where Ar is an arylene group optionally having a substituent. X may be for example H, Me (a methyl group), Cl, Br, I, F, CN and/or $CF_3$. In this specification, "Me" means a methyl group.

The fluorine-containing monomer (a) is preferably a compound of the formula:

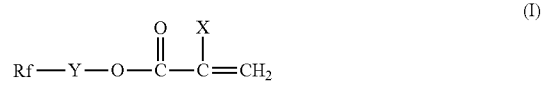

(I)

wherein X is a hydrogen atom, an linear or branched alkyl group having 1 to 21 carbon atoms, a halogen atom (such as a fluorine atom, a chlorine atom, a bromine atom, a iodine atom), a $CFX^1X^2$ group (wherein $X^1$ and $X^2$ is a hydrogen atom or a halogen atom (such as a fluorine atom, a chlorine atom, a bromine atom or a iodine atom)), a cyano group, a linear or branched fluoroalkyl group having 1 to 21 carbon atoms, a substituted or unsubstituted benzyl group, or a substituted or unsubstituted phenyl group,
Y is a direct bond, an aliphatic group having 1 to 10 carbon atoms, an aromatic or cycloaliphatic group having 6 to 10 carbon atoms, a —CH$_2$CH$_2$N(R$^1$)SO$_2$— group (wherein R$^1$ is an alkyl group having 1 to 4 carbon atoms) or
—CH$_2$CH(OY$^1$)CH$_2$— group (wherein Y$^1$ is a hydrogen atom or an acetyl group),
Rf is a linear or branched fluoroalkyl group having 1 to 21 carbon atoms.

The alpha-position of the fluorine-containing monomer may be substituted with a halogen atom or the like. Accordingly, in the formula (I), X may be an linear or branched alkyl group having 2 to 21 carbon atoms, a fluorine atom, a chlorine atom, a bromine atom, a iodine atom, a CFX$^1$X$^2$ group (wherein X$^1$ and X$^2$ is a hydrogen atom, a fluorine atom, a chlorine atom, a bromine atom or a iodine atom), a cyano group, a linear or branched fluoroalkyl group having 1 to 21 carbon atoms, a substituted or unsubstituted benzyl group, or a substituted or unsubstituted phenyl group.

In the formula (I), the Rf group is preferably a perfluoroalkyl group. The carbon number of the Rf group is from 1 to 21, for example, from 1 to 6, particularly from 1 to 5, especially from 1 to 4.

Y is preferably an aliphatic group having 1 to 10 carbon atoms, an aromatic group or cycloaliphatic group having 6 to 10 carbon atoms, a —CH$_2$CH$_2$N(R$^1$)SO$_2$— group (R$^1$ is an alkyl group having 1 to 4 carbon atoms) or a —CH$_2$CH(OY$^1$)CH$_2$— group (Y$^1$ is a hydrogen atom or an acetyl group). The aliphatic group is preferably an alkylene group (particularly the carbon number is from 1 to 4, for example, 1 or 2). The aromatic group and cycloaliphatic group may be substituted or unsubstituted.

The examples of the fluorine-containing monomer (a) are as follows:

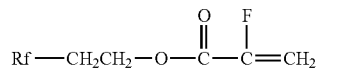
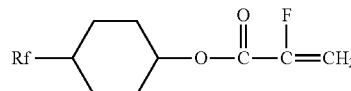
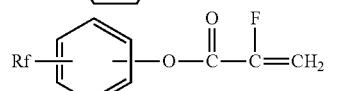
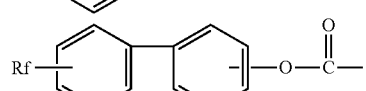
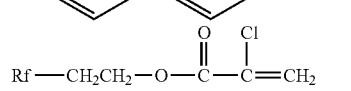
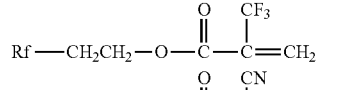
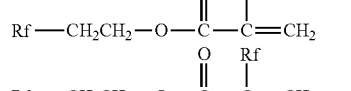
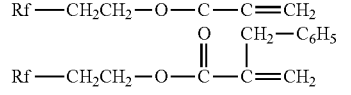
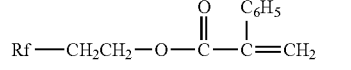

wherein Rf is a linear or branched fluoroalkyl group having 1 to 21, for example, 1 to 6 carbon atoms.

Other representative non-limiting examples of the fluorine-containing monomer (a) include the followings:

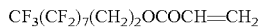
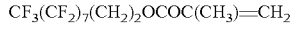
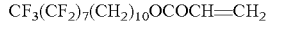
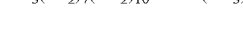
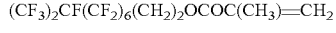
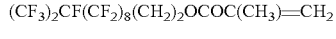
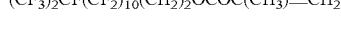
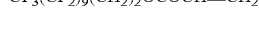
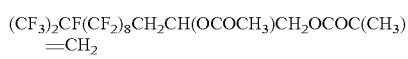
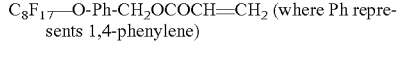

C$_8$F$_{17}$—O-Ph-CH$_2$OCOCH=CH$_2$ (where Ph represents 1,4-phenylene)

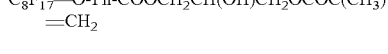
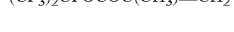
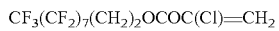
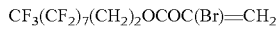

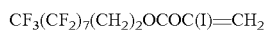

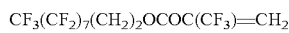

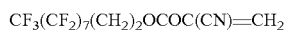

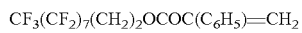

(b) Fluorine-Free Monomer

The fluorine-containing polymer may have the repeating units derived from the fluorine-free monomer (b). The fluorine-free monomer (b) is other than the crosslinkable monomer (c). The monomer (b) is preferably a fluorine-free monomer having a carbon-carbon double bond. The monomer (b) is preferably a vinyl monomer which is free from fluorine. The fluorine-free monomer (b) is generally a compound having one carbon-carbon double bond. Preferable examples of the fluorine-free monomer (b) include, for example, ethylene, vinyl acetate, vinyl halide such as vinyl chloride, vinylidene halide such as vinylidene chloride, acrylonitrile, styrene, polyethyleneglycol (meth)acrylate, polypropyleneglycol (meth)acrylate, methoxypolyethyleneglycol (meth)acrylate, methoxypolypropyleneglycol (meth)acrylate, vinyl alkyl ether and isoprene. The fluorine-free monomer (b) is not limited to these examples. The fluorine-free monomer (b) may contain vinyl halide and/or vinylidene halide.

The fluorine-free monomer (b) may be a (meth)acrylate ester having an alkyl group. The number of carbon atoms of the alkyl group may be from 1 to 30, for example, from 6 to 30, e.g., from 10 to 30. For example, fluorine-free monomer (b) may be acrylates of the general formula:

$$CH_2=CA^1COOA^2$$

wherein $A^1$ is a hydrogen atom, a methyl group, or a halogen atom (for example, a chlorine atom, a bromine atom and a iodine atom) other than a fluorine atom, and $A^2$ is an alkyl group represented by $C_nH_{2n+1}$ (n=1 to 30).

(c) Crosslinkable Monomer

The fluorine-containing polymer may contain the repeating units derived from the crosslinkable monomer (c). The crosslinkable monomer (c) may be a fluorine-free vinyl monomer having at least two reactive groups and/or carbon-carbon atoms. The crosslinkable monomer (c) may be a compound having at least two carbon-carbon double bonds, or a compound having at least one carbon-carbon double bond and at least one reactive group. Examples of the reactive group include a hydroxyl group, an epoxy group, a chloromethyl group, a blocked isocyanate group, an amino group and a carboxyl group.

Examples of the crosslinkable monomer (c) include diacetoneacrylamide, (meth)acrylamide, N-methylolacrylamide, hydroxymethyl (meth)acrylate, hydroxyethyl (meth)acrylate, 3-chloro-2-hydroxypropyl (meth)acrylate, N,N-dimethylaminoethyl (meth)acrylate, N,N-diethylaminoethyl (meth)acrylate, butadiene, chloroprene, glycerol (meth)acrylate and glycidyl (meth)acrylate, to which the crosslinkable monomer is not limited.

The copolymerization with the monomer (b) and/or the monomer (c) can optionally improve various properties such as water repellency and soil resistance; cleaning durability and washing durability of said repellency and resistance; solubility in solvent; hardness; and feeling.

In the fluorine-containing polymer,
the amount of the fluorine-free monomer (b) may be from 0.1 to 100 parts by weight, for example, from 0.1 to 50 parts by weight, and
the amount of the crosslinkable monomer (c) may be at most 50 parts by weight, for example, at most 20 parts by weight, particularly, from 0.1 to 15 parts by weight, based on 100 parts by weight of the fluorine-containing monomer (a).

The monomer (A) can be polymerized in the presence of the vinyl organopolysiloxane (B). Examples of an olefinically unsaturated co-monomer included in the monomer (A) include alkyl acrylate or methacrylate esters having 1 to 30 carbon atoms in the alkyl group such as butyl acrylate, ethyl acrylate, methyl acrylate, methyl methacrylate or butyl methacrylate. The alkyl acrylate or methacrylate can be used to adjust the glass transition temperature (Tg) of the resulting polymeric product resulting from the reaction of the fluorine-containing monomer (A) and the vinyl functional organopolysiloxane (B); for example an acrylate having a long chain alkyl group of 4-20, particularly 8-20 carbon atoms such as stearyl acrylate or methacrylate, octyl acrylate, 2-ethylhexyl acrylate or dodecyl acrylate or methacrylate can be used to form a softer polymer of lower Tg. Copolymers with an alkyl acrylate or methacrylate monomer may improve various properties such as water- and oil-repellency and soil releasability, cleaning durability, washing durability and abrasion resistance of such repellency and releasability, solubility in solvent, hardness and feel (handle). Other acrylate or methacrylate comonomers which can be used include polyethylene glycol acrylate or methacrylate, polypropylene glycol acrylate or methacrylate, methoxypolyethylene glycol acrylate or methacrylate and methoxypolypropylene glycol acrylate or methacrylate. Other olefinically unsaturated comonomers which can be used include vinyl chloride, vinylidene chloride, styrene, acrylonitrile, methacrylonitrile, ethylene, a vinyl alkyl ether, isoprene or a vinyl ester such as vinyl acetate or vinyl propionate. The olefinically unsaturated comonomer can be used which contains a functional group that, although not reactive with amine groups, may be reactive with other functional groups to give properties such as increased substantivity on textiles and other substrates. Examples of such functional groups are hydroxyl, amino and amide, and examples of olefinically unsaturated comonomers containing them are acrylamide, methacrylamide, N-methylolacrylamide, hydroxyethyl methacrylate, hydroxyethyl acrylate, 3-chloro-2-hydroxypropyl acrylate or methacrylate, N,N-dimethylaminoethyl acrylate or methacrylate and diethylaminoethyl acrylate or methacrylate.

(B) The Vinyl Functional Organopolysiloxane

Component (B) of the present invention is a vinyl functional organopolysiloxane, that is, an organopolysiloxane having a vinyl functional organic group present in the molecule. As used herein, a "vinyl functional organic group" is .

The vinyl group-containing silicone (B) (that is, the vinyl functional organopolysiloxane (B)) is a siloxane compound which has at least one (for example, 1 to 500, particularly 2 to 50) vinyl group and a silicone moiety having two or more siloxane linkages. The vinyl group-containing silicone (B) functions as a chain transfer agent. By a polymerization reaction, the vinyl group-containing silicone (B) bonds to the fluorine-containing polymer though the vinyl functional organic group.

Organopolysiloxanes are well known in the art and are often designated by the general formula $R_nSiO_{(4-n)/2}$, where the organopolysiloxanes may comprise any number of "M" (mono functional) siloxy units ($R_3SiO_{0.5}$), "D" (difunctional) siloxy units ($R_2SiO$), "T" (trifunctional) siloxy units ($RSiO_{1.5}$), or "Q" siloxy units ($SiO_2$) where R is independently a monovalent organic group. These siloxy units can be combined in various manners to form cyclic, linear, or branched structures. The chemical and physical properties of the resulting polymeric structures can vary. For example, organopolysiloxanes can be volatile or low viscosity fluids, high viscosity fluids/gums, elastomers or rubbers, and resins. R is independently a monovalent organic group, alternatively R is a hydrocarbon group containing 1 to 30 carbons, alternatively R is an alkyl group containing 1 to 30 carbon atoms, or alternatively R is methyl.

The organopolysiloxanes useful as component (B) in the present invention are characterized by having at least one of the R groups in the formula $R_nSiO_{(4-n)/2}$ be a vinyl group, or alternatively at least one of the R groups be a vinyl group and one of the R groups be an organofunctional group, or alternatively one of the R groups be an organofunctional group also containing a vinyl group. The organofunctional group and vinyl functional group may be present on any siloxy unit having an R substituent, that is, they may be present on any M, D, or T unit. Typically, the organofunctional groups and vinyl groups are present as a R substituent on a D siloxy unit.

As used herein, "organofunctional group" means an organic group containing any number of carbon atoms, but the group contains at least one atom other than carbon and hydrogen. Representative examples of such organofunctional groups include, hydroxyls, amines, amides, sulfonamides, quaternaries, ethers, epoxy, phenols, esters, carboxyls, ketones, halogen-substituted alkyls and aryls group, to name a few. Alternatively, the organofunctional group is an amino-functional organic group.

When the organofunctional group is an amino-functional organic group, the amino-functional organic group is designated in the formulas herein as $R^N$ and is illustrated by groups having the formula: —$R^1NHR^2$, —$R^1NR_2^2$, or —$R^1NHR^1NHR^2$, wherein each $R^1$ is independently a divalent hydrocarbon group having at least 2 carbon atoms, and $R^2$ is hydrogen or an alkyl group. Each $R^1$ is typically an alkylene group having from 2 to 20 carbon atoms. $R^1$ is illustrated by groups such as; —$CH_2CH_2$—, —$CH_2CH_2CH_2$—, —$CH_2CHCH_3$—, —$CH_2CH_2CH_2CH_2$—, —$CH_2CH(CH_3)CH_2$—, —$CH_2CH_2CH_2CH_2CH_2$—, —$CH_2CH_2CH_2CH_2CH_2CH_2$—, —$CH_2CH_2CH(CH_2CH_3)CH_2CH_2CH_2$—, —$CH_2CH_2CH_2CH_2CH_2CH_2CH_2CH_2$—, and —$CH_2CH_2CH_2CH_2CH_2CH_2CH_2CH_2CH_2CH_2$—. The alkyl groups $R^2$ are as illustrated above for R. When $R^2$ is an alkyl group, it is typically methyl.

Some examples of suitable amino-functional hydrocarbon groups are; —$CH_2CH_2NH_2$, —$CH_2CH_2CH_2NH_2$, —$CH_2CHCH_3NH$, —$CH_2CH_2CH_2CH_2NH_2$, —$CH_2CH_2CH_2CH_2CH_2NH_2$, —$CH_2CH_2CH_2CH_2CH_2CH_2NH_2$, —$CH_2CH_2NHCH_3$, —$CH_2CH_2CH_2NHCH_3$, —$CH_2(CH_3)CHCH_2NHCH_3$, —$CH_2CH_2CH_2CH_2NHCH_3$, —$CH_2CH_2NHCH_2CH_2NH_2$, —$CH_2CH_2CH_2NHCH_2CH_2NH_2$, —$CH_2CH_2CH_2CH_2NHCH_2CH_2CH_2NH_2$, —$CH_2CH_2NHCH_2CH_2NHCH_3$, —$CH_2CH_2CH_2NHCH_2CH_2NHCH_3$, —$CH_2CH_2CH_2CH_2NHCH_2CH_2CH_2NHCH^3$, and —$CH_2CH_2NHCH_2CH_2NHCH_2CH_2CH_3$. Typically, the amino functional group is —$CH_2CH_2CH_2NH_2$.

The vinyl functional organic group is designated in the formulas herein as $R^V$. The vinyl functional group is —$CH_2=CH_2$.

In a preferable embodiment, the vinyl functional organopolysiloxane (designated B') comprises siloxy units having the average formula:

where; a is 0-4000, alternatively 1 to 1000, alternatively 2 to 400,
b is 1-1000, alternatively 2 to 100, alternatively 3 to 50,
c is 1-1000, alternatively 2 to 100, alternatively 3 to 50;
R each is independently a monovalent organic group, alternatively R each is a hydrocarbon containing 1-30 carbon atoms,
alternatively R each is a monovalent alkyl group containing 1-12 carbons, or
alternatively R each is a methyl group;
$R^N$ each is a monovalent amino functional organic group as defined above,
$R^V$ each is a vinyl functional organic group as defined above.

The $R^N$ group may be $R^F$ wherein $R^F$ may be a monovalent organofunctional organic group as defined above, such as hydroxyls, amines, amides, sulfonamides, quaternaries, ethers, epoxy, phenols, esters, carboxyls, ketones, halogen-substituted alkyls and aryls group. The vinyl functional organopolysiloxane may comprise siloxy units having the average formula

wherein the groups and subscripts (that is, a, b and c) are the same define above.

Organopolysiloxane (B') may be terminated with a hydrogen atom (resulting in a silanol group on the terminal siloxy unit of the terpolymer), or with an alkyl group containing 1-30 carbon atoms (resulting in an alkoxy group on the terminal siloxy unit of the terpolymer). When an alkyl group is used, the alkyl group can be a linear or branched alkyl, containing 1-30 carbons, alternatively the alkyl group can be a long chain alkyl group of 4-20, alternatively 8-20 carbon atoms such as stearyl. Alternatively the organopolysiloxane can be terminated with a trimethylsilyl group.

The vinyl group-containing silicone (B) is of, for example, the formula:

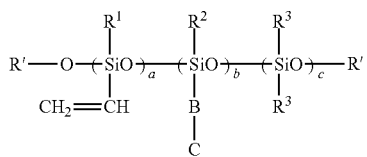

wherein $R^1$ is a methyl group, a methoxy group, a phenyl group, or a hydroxyl group,
$R^2$ is a methyl group, a methoxy group, a phenyl group, or a hydroxyl group,
$R^3$ is a methyl group, a methoxy group, a phenyl group, or a hydroxyl group,
R' is a hydrogen atom, an alkyl group having 1 to 40 carbon atoms, or $Me_3Si$,
A is a divalent saturated hydrocarbon group having 1-10 carbon atoms which may be interrupted with one or two ether linkages,
B is a divalent saturated hydrocarbon group having 1-10 carbon atoms which may be interrupted with one or two ether linkages,
C is hydroxyls, amines, amides, sulfonamides, quaternaries, ethers, epoxy, phenols, esters, carboxyls, ketones, halogen-substituted alkyls or aryls group,
a, b, and c are integers showing the number of repeat units, a is from 1 to 4000, for example, 2 to 2000, b is from 1 to 1000, preferably from 2 to 800, and c is from 0 to 1000, preferably from 1 to 800.

The example of vinyl group-containing silicone (B) is as follows.

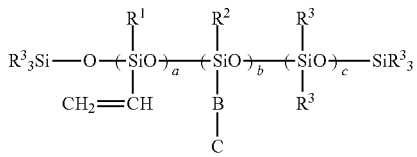

wherein the groups such as the R$^1$ group and the subscripts are defined as the same as above-mentioned.

The functional group C is particularly preferably an amino group (that is, the vinyl group-containing silicone (B) is a vinylaminosilicone). The amino group has the effect of remarkably improving the affinity with other materials constituting the cosmetic and with a human body skin.

The organopolysiloxane (B') of the above-mentioned preferable embodiment can be represented by the following average formula for example;

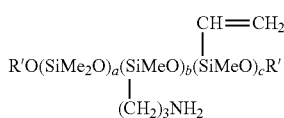

where; a is 0-4000, alternatively 1 to 1000, alternatively 2 to 400,
b is 1-1000, alternatively 2 to 100, alternatively 3 to 50,
c is 1-1000, alternatively 2 to 100, alternatively 3 to 50;
and R' each is, the different or the same, H, an alkyl group having 1 to 40 carbon atoms, or Me$_3$Si.

The vinylaminofunctional organopolysiloxane terpolymers of this preferable embodiment (B') can be prepared by any technique known in the art for preparation of organopolysiloxane terpolymers containing amino and/or vinyl functional groups. Typically, the organopolysiloxanes (B') are prepared via a condensation polymerization reaction of an amino functional alkoxy silane, a vinyl functional silane monomer, and organopolysiloxane having alkoxy or silanol termination as illustrated by the following general reaction scheme.

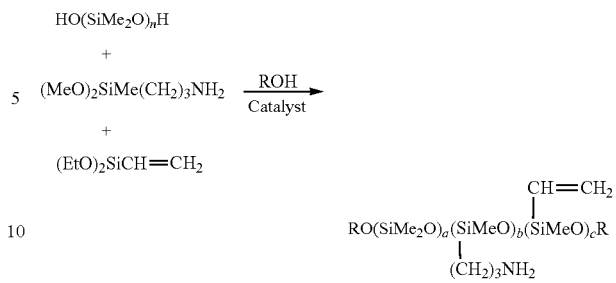

Condensation organopolysiloxanes are well known in the art and are typically catalyzed by the addition of a strong base, such as an alkaline metal hydroxide or a tin compound. Alternatively co-polymerization of the functionalized cyclosiloxanes could be used.

The fluorine-containing polymer may have a weight-average molecular weight of 2,000 to 5,000,000, particularly 3,000 to 5,000,000, especially 10,000 to 1,000,000. The weight-average molecular weight (in terms of polystyrene) of the fluorine-containing polymer can be determined by GPC (Gel Permeation Chromatography).

The fluorine-containing polymer may be a random copolymer, an alternate copolymer, a block copolymer or a graft copolymer. In one of embodiments, the fluorine-containing polymer is a graft polymer wherein a trunk comprises the vinyl functional organopolysiloxane and a branch comprises the monomer comprising the fluorine-containing monomer.

Examples of the fluorine-containing polymer include the following:

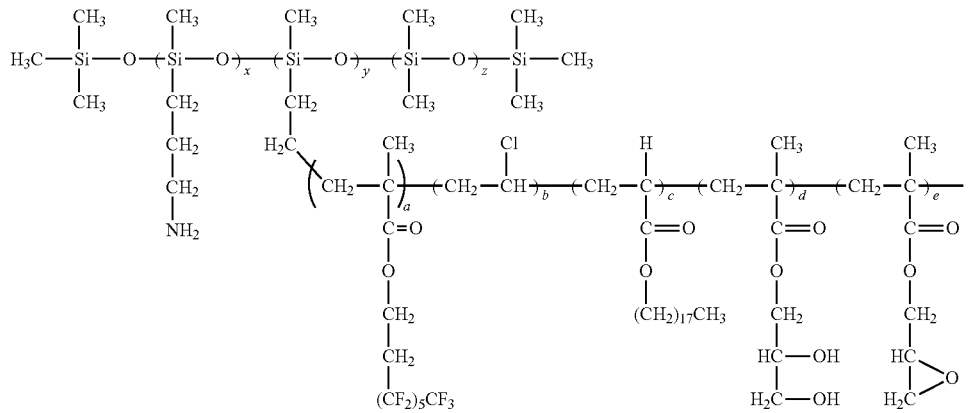

wherein x is 1-4000, y is 1-1000, z is 1-1000, a is 1 to 4000, and b, c, d and e are 0 to 1000. In the fluorine-containing polymer, the repeating units may not be positioned as shown in the chemical formulas, and the fluorine-containing polymer may be a random polymer or block copolymer.

The fluorine-containing polymer of the present invention can be produced by bulk polymerization, solution polymerization and emulsion polymerization.

In the bulk polymerization, a method is adopted in which a mixture of the monomers and the vinyl silicone is purged by nitrogen, a polymerization initiator is then added, and the mixture is stirred in the range of from 30 to 80° C. for several (2 to 15) hours to be polymerized. Examples of the polymerization initiator include azobisisobutyronitrile, benzoyl peroxide, di-tert-butyl peroxide, lauryl peroxide, cumene hydroperoxide, t-butyl peroxypivalate and diisopropyl peroxydicarbonate. The polymerization initiator may be used in the amount within the range from 0.01 to 20 parts by weight, for example, from 0.01 to 10 parts by weight, based on 100 parts by weight of the monomers.

In the case of the solution polymerization, the mixture of the monomers and the vinyl silicone is dissolved in a suitable organic solvent in which these can dissolve and to which these are inert, and then polymerized in the same manner as described earlier. Examples of the organic solvent include a hydrocarbon-based solvent, an ester-based solvent, a ketone-based solvent, an alcohol-based solvent, a silicone-based solvent, and a fluorine-containing solvent. The organic solvent is inert to the monomer and dissolves the monomer, and examples thereof include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane. The organic solvent may be used in the amount within the range from 50 to 2,000 parts by weight, for example, from 50 to 1,000 parts by weight, based on 100 parts by weight of total of the monomers.

In the solution polymerization, there can be used a method of dissolving the monomer(s) into an organic solvent in the presence of a polymerization initiator, replacing the atmosphere by nitrogen, and stirring the mixture with heating, for example, at the temperature within the range from 30 degrees C. to 120 degrees C. for 1 hour to 10 hours.

In the case of the emulsion polymerization, the polymerization is carried out in the same manner as described above after emulsifying a mixture of the monomers and the vinyl silicone in water using a proper emulsifier. In some combinations of the monomers (a) to (c) and the vinyl silicone, a poor compatibility of the monomers and the vinyl silicone in water results in a poor copolymerizability. In such a case, a method in which a proper auxiliary solvent such as glycols and alcohols and/or a low molecular weight monomer is added to improve the compatibility of the mixture is adopted. A hydrophobic group in the emulsifier to be used in the emulsion polymerization may be any of hydrocarbon type, silicon-containing type and fluorine-containing type. As for the ionicity of a hydrophilic group, any of nonionic one, anionic one, cationic one and amphoteric one may be used. As the polymerization initiator for emulsion polymerization, for example, water-soluble initiators (e.g., benzoyl peroxide, lauroyl peroxide, t-butyl perbenzoate, 1-hydroxycyclohexyl hydroperoxide, 3-carboxypropionyl peroxide, acetyl peroxide, azobisisobutylamidine dihydrochloride, azobisisobutyronitrile, sodium peroxide, potassium persulfate and ammonium persulfate) and oil-soluble initiators (e.g., azobisisobutyronitrile, benzoyl peroxide, di-tert-butyl peroxide, lauryl peroxide, cumene hydroperoxide, t-butyl peroxypivalate and diisopropyl peroxydicarbonate) are used. The polymerization initiator may be used in the amount within the range from 0.01 to 10 parts by weight based on 100 parts by weight of the monomers.

In the emulsion polymerization, there can be used a method of emulsifying monomers in water in the presence of a polymerization initiator and an emulsifying agent, replacing the atmosphere by nitrogen, and polymerizing with stirring, for example, at the temperature within the range from 30 degrees C. to 120 degrees C., for example, from 50 degrees C. to 80 degrees C., for 1 hour to 10 hours.

When the monomers are not completely compatibilized, a compatibilizing agent capable of sufficiently compatibilizing them (e.g., a water-soluble organic solvent and a low-molecular weight monomer) is preferably added to these monomers. By the addition of the compatibilizing agent, the emulsifiability and polymerizability can be improved.

Examples of the water-soluble organic solvent include acetone, methyl ethyl ketone, ethyl acetate, propylene glycol, dipropylene glycol monomethyl ether, dipropylene glycol, tripropylene glycol and ethanol. The water-soluble organic solvent may be used in the amount within the range from 1 to 50 parts by weight, e.g., from 10 to 40 parts by weight, based on 100 parts by weight of water. Examples of the low-molecular weight monomer are methyl methacrylate, glycidyl methacrylate, 2,2,2-trifluoroethyl methacrylate. The low-molecular weight monomer may be used in the amount within the range from 1 to 50 parts by weight, e.g., from 10 to 40 parts by weight, based on 100 parts by weight of total of monomers.

As the emulsifying agent, various emulsifying agents such as an anionic emulsifying agent, a cationic emulsifying agent and a nonionic emulsifying agent can be used in the amount within the range from 0.5 to 20 parts by weight based on 100 parts by weight of the monomers. The emulsifying agent used in the emulsion polymerization may have a hydrophobic group which may be a hydrocarbon, a silicone or a fluorine-containing compound, and hydrophilic group which may be nonionic, anionic, cationic or amphoteric. A combination of the anionic emulsifying agent and the nonionic emulsifying agent is preferable in order to obtain both the stability of the emulsion and safety to skin. The amount of the anionic emulsifying agent is from 5 to 80% by weight, preferably from 10 to 60% by weight, based on the total of the anionic emulsifying agent and the nonionic emulsifying agent. Preferably, the anionic emulsifying agent is polyoxyethylene alkyl (preferably $C_1$ to $C_{30}$ alkyl) ether sulfate salt, and the nonionic emulsifying agent is fatty acid sorbitan ester, polyoxyethylene fatty acid sorbitan ester, polyoxyethylene hardened castor oil and/or polyoxyethylene fatty acid sorbit ester.

In order to obtain a polymer dispersion in water, which has a high polymer solid content and which has very fine and stable particles, it is desirable that the mixture of the monomers and the vinyl silicone is dispersed in water by using an emulsifying device capable of applying a strong shearing energy (e.g., a high-pressure homogenizer and an ultrasonic homogenizer) to prepare the fine particles of the mixture, and then the polymerization is conducted.

The fluorosilicone reaction product of the fluorine-containing monomer (A) and the vinyl organopolysiloxane (B) may be prepared by any reaction process known in the art to effect polymerisation of such monomers. Preferably, the fluorosilicone may be prepared according to the process of the present invention comprising;
I) reacting,
(A) a monomer comprising a fluorine-containing monomer of the formula:

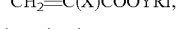
$CH_2=C(X)COOYRf$,

X is a hydrogen atom, a monovalent organic group, or a halogen atom,
Y is a direct bond or a divalent organic group having 1 to 20 carbon atoms, and
Rf is a fluoroalkyl group having 1 to 21 carbon atoms,
in the presence of
(B) a vinyl functional organopolysiloxane,
via a polymerization reaction, preferably a free radical polymerisation reaction.

Components (A) and (B) in the process are the same as described above.

The process may also be conducted in the presence of a polar organic solvent. The polar organic solvent can be one or more alcohol, ketone or ester solvents selected from butanol, t-butanol, isopropanol, butoxyethanol, methyl isobutyl ketone, methyl ethyl ketone, butyl acetate or ethyl acetate and/or an aromatic hydrocarbon such as xylene, toluene or trimethylbenzene a blend of one or more of these.

The initiator for the free radical polymerisation reaction can be any compound known in the art for initiating free radical reactions, such as organic peroxides or azo compounds. Representative, non-limiting examples are; azo compounds such as azobisisobutyronitrile or azobisisovaleronitrile (AIVN), peroxides such as benzoyl peroxide. The polymerisation temperature typically ranges 50-120° C.

Alternatively the polymeric reaction product can be obtained using the technique of emulsion polymerisation, where all the components are polymerised in the presence of water, surfactants and polymerisation initiator.

The fluorosilicone reaction product can contain various ratios of the fluorine-containing monomer (A) and the vinyl organopolysiloxane (B), as controlled by the amount of each component (A) and (B). The fluorosilicone may contain 5 to 99.9% by weight, preferably 10 to 95% by weight of the monomer (A), and 0.1 to 95% by weight, preferably 5 to 90% by weight of the vinyl organopolysiloxane (B) with the proviso that sum of the wt % of (A) and (B) equals 100%. A fluorosilicone product having a high proportion of vinyl organopolysiloxane may provide greater substantivity to fibrous substrates or softness of handle of the treated material. A polymeric product having a high proportion of fluorine-containing monomer may provide maximum hydrophobicity and oleophobicity.

The fluorosilicone reaction product is generally obtained as a solution. It can be isolated by evaporation of the solvent. For application as an oil repellent, the fluorosilicone reaction product is generally required in liquid form and the solution obtained by reaction can often be diluted to a solution suitable for application to textiles. Alternatively the fluorosilicone reaction product can be dissolved in a different solvent for application to textiles, for example in a polar organic solvent of higher boiling point. The fluorosilicone reaction product can alternatively be emulsified by mixing with water and an emulsifying agent, such as a cationic surfactant and/or a non-ionic or anionic surfactant. The fluorosilicone reaction product can be isolated before emulsification or the polymerisation product solution can be emulsified, optionally with removal of solvent. If the polymeric product is obtained by emulsion polymerisation, the emulsion is generally used, diluted as required, without isolating the polymeric product.

The solution or emulsion of fluorosilicone reaction product can be applied to fibrous substrates such as textiles by any of the methods known for treatment of textiles with liquids. The concentration of the fluorosilicone reaction product in the solution applied to the textile can for example be 0.5 to 20% by weight, alternatively 1 to 5%. When the textile is a fabric, the fabric can be immersed in the solution or can be padded or sprayed with the solution. The treated textile is dried and is preferably heated, for example at 100-200° C., to develop the oil repellency.

Alternatively, the fluorosilicone reaction product can be applied to a textile via a cleaning process, such as in a laundry application or dry cleaning process.

The textile which is treated is typically a fabric, including woven, knitted and nonwoven fabrics, fabrics in garment form and carpet, but may also be a fibre or yarn or intermediate textile product such as a sliver or roving. The textile material can be a natural fibre such as cotton or wool, a manmade fibre such as viscose rayon or lyocell or a synthetic fibre such as polyester, polyamide or acrylic fibre, or can be a mixture of fibres such as a mixture of natural and synthetic fibres. The polymeric product of the invention is particularly effective in rendering cellulosic fibres such as cotton or rayon oleophobic and oil repellent. The process of the invention generally also renders the textile hydrophobic and water repellent. Fabric treatment with the polymeric product of the invention imparts oil repellency to fabrics whilst at the same time imparting an improvement in feel compared to untreated fabric and also imparting an improvement in feel compared to fabric treated with known fluoropolymer textile treatment agents.

The fibrous substrate can alternatively be leather. The polymeric product can be applied to leather from aqueous solution or emulsion at various stages of leather processing, for example during leather wet end processing or during leather finishing, to render the leather hydrophobic and oleophobic.

The fibrous substrate can alternatively be paper. The polymeric product can be applied to preformed paper or at various stages of papermaking, for example during drying of the paper.

The surface treatment agent of the present invention is preferably in the form of a solution, an emulsion or an aerosol. The surface treatment agent generally comprises the fluorine-containing polymer and a medium (particularly a liquid medium, for example, an organic solvent and/or water). The concentration of the fluorine-containing polymer in the surface treatment agent may be, for example, from 0.1 to 50% by weight.

The surface treatment agent can be applied to a substrate to be treated by a know procedure. The application of the surface treatment agent can be conducted by immersion, spraying and coating. Usually, the surface treatment agent is diluted with an organic solvent or water, is adhered to surfaces of the substrate by a well-known procedure such as an immersion coating, a spray coating and a foam coating, and is dried. If necessary, the treatment liquid is applied together with a suitable crosslinking agent, followed by curing. It is also possible to add mothproofing agents, softeners, antimicrobial agents, flame retardants, antistatic agents, paint fixing agents, crease-proofing agents, etc. to the surface treatment agent. The concentration of the fluorine-containing compound in the treatment liquid contacted with the substrate may be from 0.01 to 10% by weight (particularly for immersion coating), for example, from 0.05 to 10% by weight (particularly for spray coating), based on the treatment liquid.

The substrate to be treated with the surface treatment agent (for example, a water- and oil-repellent agent) of the present invention is preferably a textile. The textile includes various examples. Examples of the textile include animal- or vegetable-origin natural fibers such as cotton, hemp, wool and silk; synthetic fibers such as polyamide, polyester, polyvinyl alcohol, polyacrylonitrile, polyvinyl chloride and polypropylene; semisynthetic fibers such as rayon and acetate; inorganic fibers such as glass fiber, carbon fiber and asbestos fiber; and a mixture of these fibers.

The textile may be in any form such as a fiber, a yarn and a fabric.

The term "treatment" means that the treatment agent is applied to the substrate by immersion, spray, coating or the like. The fluorine-containing polymer which is an active component of the treatment agent can penetrate the internal of the substrate or can adhere on the surface of the substrate by the treatment.

EXAMPLES

The following Preparative Examples and Examples further illustrate the present invention in detail but are not to be construed to limit the scope thereof. All parts and percentages in the examples are on a weight basis and all measurements were obtained at about 23° C., unless indicated to the contrary.

1. Shower Water Repellency Test (JIS-L-1092)

Shower water repellency test was conducted according to JIS-L-1092. The shower water repellency was expressed by water repellency No. (as shown in the below-described Table 1).

A glass funnel which has a volume of at least 250 ml and a spray nozzle which can spray 250 ml of water for 20-30 seconds are used. A test piece flame is a metal flame having a diameter of 15 cm. Three sheets of a test piece having a size of about 20 cm×20 cm are prepared and the sheet is mounted on a test piece holding flame so that the sheet has no wrinkle. The center of the spray was located on the center of the sheet. Room temperature water (250 mL) is charged into the glass funnel and sprayed on the test piece sheet (for time of 25-30 seconds). The holding flame is removed from a stand, one edge of the holding flame is grasped so that a front surface is downside and the other edge is lightly hit with a stiff substance. The holding flame is further rotated 180° and the same procedure is repeated to drop excess water droplets. The wet test piece is compared with a wet comparison standard to grade 0, 50, 70, 80, 90 and 100 points in order of poor water-repellency to excellent water repellency. The results are obtained from an average of the measurements.

TABLE 1

| Water repellency No. | State |
|---|---|
| 100 | No wet or water droplets adhesion on surface |
| 90 | No wet but small water droplets adhesion on surface |
| 80 | Separate small water droplets-like wet on surface |
| 70 | Wet on half of surface and separate small wet which penetrates fabric |
| 50 | Wet on whole surface |
| 0 | Wet on front and back whole surfaces |

2. Water-Repellency Test (According to AATCC Test Method 118-1992)

A treated fabric is stored in a thermo-hygrostat having a temperature of 21° C. and a humidity of 65% for at least 4 hours. A test liquid (isopropyl alcohol (IPA), water, and a mixture thereof, as shown in Table 2) which has been also stored at 21° C. is used. The test is conducted in an air-conditioned room having a temperature of 21° C. and a humidity of 65%. Five droplets of the test liquid wherein one droplet has an amount of 50 μL are softly dropped by a micropipette on the fabric. If 4 or 5 droplets remain on the fabric after standing for 30 seconds, the test liquid passes the test. The water-repellency is expressed by a point corresponding to a maximum content of isopropyl alcohol (% by volume) in the test liquid which passes the test. The water-repellency is evaluated as twelve levels which are Fail, 0, 1, 2, 3, 4, 5, 6, 7, 8, 9 and 10 in order of a bad level to an excellent level.

TABLE 2

| | Water-repellency test liquid | |
|---|---|---|
| | (% by volume) | |
| Point | Isopropyl alcohol | Water |
| 10 | 100 | 0 |
| 9 | 90 | 10 |
| 8 | 80 | 20 |
| 7 | 70 | 30 |
| 6 | 60 | 40 |
| 5 | 50 | 50 |
| 4 | 40 | 60 |
| 3 | 30 | 70 |
| 2 | 20 | 80 |
| 1 | 10 | 90 |
| 0 | 0 | 100 |
| Fail | Inferior to isopropyl alcohol 0/water 100 | |

3. Oil-Repellency Test (According to AATCC Test Method 118-1992)

A treated fabric is stored in a thermo-hygrostat having a temperature of 21° C. and a humidity of 65% for at least 4 hours. A test liquid (shown in Table 3) which has been also stored at 21° C. is used. The test is conducted in an air-conditioned room having a temperature of 21° C. and a humidity of 65%. Five droplets of the test liquid wherein one droplet has an amount of 50 μL are softly dropped by a micropipette on the fabric. If 4 or 5 droplets remain on the fabric after standing for 30 seconds, the test liquid passes the test. The oil-repellency is expressed by a maximum point of the test liquid which passes the test. The oil-repellency is evaluated as nine levels which are Fail, 1, 2, 3, 4, 5, 6, 7 and 8 in order of a bad level to an excellent level.

TABLE 3

| | Oil-repellency test liquid | |
|---|---|---|
| Point | Test liquid | Surface tension (dyne/cm, 25° C.) |
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | Mixture liquid of n-Hexadecane 35/nujol 65 | 29.6 |
| 1 | Nujol | 31.2 |
| Fail | Inferior to 1 | — |

4. Washing Durability of Water- and Oil-Repellency

Washing is conducted repeatedly ten times or twenty times according to JIS L-0217-103 method, and then water- and oil-repellency is evaluated (HL10 or HL20). HL0 means that the evaluation is made after no washing.

5. Feeling

The feeling of a treated PET fabric is determined by hand touch according to the following criteria.
Very good: Remarkably softer than untreated fabric
Good: Same softness as or softer than untreated fabric
Poor: Harder than untreated fabric 6. Stability of Treatment Liquid The presence or absence of sedimentation of a treatment liquid prepared for treatment is observed.
Good: Absence of sedimentation
Poor: Presence of sedimentation
Synthesis of Vinylaminofunctional Siloxanes
Vinylamino Siloxane 1

Into a three necked round bottomed flask fitted with a condenser, overhead stirrer and thermocouple were charged octamethylcyclotetrasiloxane (1437 g), hexamethyldisiloxane (63 g), aminopropylmethyldiethoxysilane (41 g), 2,4,6,8-tetramethyl, 2,4,6,8-tetravinyl cyclotetrasiloxane (40 g) and aqueous potassium hydroxide (4.5 g, 40% w/w). The reaction mixture was heated to 75° C. and held at this temperature for six hours after which acetic acid (4.5 g) was added. After thirty minutes the volatiles were removed under reduced pressure (5 mbar) at 170° C.° C. for ninety minutes to yield a vinylamino siloxane terpolymer.

Vinylamino Siloxane 2

Into a three necked round bottomed flask fitted with a condenser, overhead stirrer and thermocouple were charged octamethylcyclotetrasiloxane (1134 g), hexamethyldisiloxane (66 g), aminopropylmethyldiethoxysilane (46 g), 2,4,6,8-tetramethyl, 2,4,6,8-tetravinyl cyclotetrasiloxane (102 g) and aqueous potassium hydroxide (4.5 g, 40% w/w). The reaction mixture was heated to 75° C. and held at this temperature for six hours after which acetic acid (4.5 g) was added. After thirty minutes the volatiles were removed under reduced pressure (5 mbar) at 170° C.° C. for ninety minutes to yield a vinylamino siloxane terpolymer.

Vinylamino Siloxane 3

Into a three necked round bottomed flask fitted with a condenser, overhead stirrer and thermocouple were charged octamethylcyclotetrasiloxane (1129 g), hexamethyldisiloxane (63 g), aminopropylmethyldiethoxysilane (48 g), 2,4,6,8-tetramethyl, 2,4,6,8-tetravinyl cyclotetrasiloxane (217 g) and aqueous potassium hydroxide (4.5 g, 40% w/w). The reaction mixture was heated to 75° C. and held at this temperature for six hours after which acetic acid (4.5 g) was added. After thirty minutes the volatiles were removed under reduced pressure (5 mbar) at 170° C.° C. for ninety minutes to yield a vinylamino siloxane terpolymer.

The physical and structural properties of the vinylaminosiloxanes are described in the table below:

|  | Viscosity (cts) | % N (w/w) | % vinyl (w/w) |
| --- | --- | --- | --- |
| Vinylamino Siloxane 1 | 191 | 0.31 | 1.47 |
| Vinylamino Siloxane 2 | 308 | 0.33 | 3.52 |
| Vinylamino Siloxane 3 | 142 | 0.42 | 6.27 |

Preparative Example 1

Into a 1 L autoclave, $CF_3CF_2$—$(CF_2CF_2)_n$—$CH_2CH_2OCOC(CH_3)$=$CH_2$ (n=2.0) (184 g), stearyl acrylate (23.1 g), glycerol monomethacrylate (4.3 g), glycidyl methacrylate (1.4 g), Vinylamino Siloxane 1 (28.4 g), pure water (500 g), tripropylene glycol (79.4 g), alkyl trimethyl ammonium chloride (3.7 g), sorbitan monopalmitate (4.5 g), polyoxyethylene oleyl ether (4.5 g) and polyoxyethylene lauryl ether (18.0 g) were charged and emulsified by ultrasonic wave at 60° C. for 15 minutes with stirring. After the atmosphere of the autoclave was replaced with nitrogen gas, vinyl chloride (67 g) was injected. Then, 2,2'-azobis(2-amidinopropane) dihydrochloride (3.6 g) was added and the reaction was conducted at 60° C. for 5 hours to give an aqueous dispersion of a polymer.

Preparative Example 2

Into a 1 L autoclave, $CF_3CF_2$—$(CF_2CF_2)_n$—$CH_2CH_2OCOC(CH_3)$=$CH_2$ (n=2.0) (184 g), stearyl acrylate (23.1 g), glycerol monomethacrylate (4.3 g), glycidyl methacrylate (1.4 g), Vinylamino Siloxane 2 (28.4 g), pure water (500 g), tripropylene glycol (79.4 g), alkyl trimethyl ammonium chloride (3.7 g), sorbitan monopalmitate (4.5 g), polyoxyethylene oleyl ether (4.5 g) and polyoxyethylene lauryl ether (18.0 g) were charged and emulsified by ultrasonic wave at 60° C. for 15 minutes with stirring. After the atmosphere of the autoclave was replaced with nitrogen gas, vinyl chloride (67 g) was injected. Then, 2,2'-azobis(2-amidinopropane) dihydrochloride (3.6 g) was added and the reaction was conducted at 60° C. for 5 hours to give an aqueous dispersion of a polymer.

Preparative Example 3

Into a 1 L autoclave, $CF_3CF_2$—$(CF_2CF_2)_n$—$CH_2CH_2OCOC(CH_3)$=$CH_2$ (n=2.0) (184 g), stearyl acrylate (23.1 g), glycerol monomethacrylate (4.3 g), glycidyl methacrylate (1.4 g), Vinylamino Siloxane 3 (28.4 g), pure water (500 g), tripropylene glycol (79.4 g), alkyl trimethyl ammonium chloride (3.7 g), sorbitan monopalmitate (4.5 g), polyoxyethylene oleyl ether (4.5 g) and polyoxyethylene lauryl ether (18.0 g) were charged and emulsified by ultrasonic wave at 60° C. for 15 minutes with stirring. After the atmosphere of the autoclave was replaced with nitrogen gas, vinyl chloride (67 g) was injected. Then, 2,2'-azobis(2-amidinopropane) dihydrochloride (3.6 g) was added and the reaction was conducted at 60° C. for 5 hours to give an aqueous dispersion of a polymer.

Comparative Preparative Example 1

Into a 1 L autoclave, $CF_3CF_2$—$(CF_2CF_2)_n$—$CH_2CH_2OCOC(CH_3)$=$CH_2$ (n=3.2) (204 g), stearyl acrylate (25.6 g), N-methylol acrylamide (6.4 g), 3-chloro-2-hydroxypropyl methacrylate (1.5 g), pure water (486 g), tripropylene glycol (88 g), alkyl trimethyl ammonium chloride (3.4 g), sorbitan monopalmitate (4.6 g), polyoxyethylene oleyl ether (4.9 g) and polyoxyethylene lauryl ether (20.0 g) were charged and emulsified by ultrasonic wave at 60° C. for 15 minutes with stirring. After the atmosphere of the autoclave was replaced with nitrogen gas, vinyl chloride (67 g) was injected. Then, 2,2'-azobis(2-amidinopropane) dihydrochloride (3.6 g) was added and the reaction was conducted at 60° C. for 5 hours to give an aqueous dispersion of a polymer.

Comparative Preparative Example 2

Into a 1 L autoclave, $CF_3CF_2$—$(CF_2CF_2)_n$—$CH_2CH_2OCOC(CH_3)$=$CH_2$ (n=2.0) (184 g), stearyl acrylate (23.1 g), glycerol mono methacrylate (4.3 g), glycidyl methacrylate (1.4 g), Mercapto Silicone 1 (Organopolysiloxane having mercapto- and amino-functional organic groups present in the molecule) (28.4 g), pure water (500 g), tripropylene glycol (79.4 g), alkyl trimethyl ammonium chloride (3.7 g), sorbitan monopalmitate (4.5 g), polyoxyethylene oleyl ether (4.5 g) and polyoxyethylene lauryl ether (18.0 g) were charged and emulsified by ultrasonic wave at 60° C. for 15 minutes with stirring. After the atmosphere of the autoclave was replaced with nitrogen gas, vinyl chloride (67 g) was injected. Then, 2,2'-azobis(2-amidinopropane) dihydrochloride (2.2 g) was added and the reaction was conducted at 60° C. for 5 hours to give an aqueous dispersion of a polymer.

Comparative Preparative Example 3

Into a 1 L autoclave, $CF_3CF_2$—$(CF_2CF_2)_n$—$CH_2CH_2OCOC(CH_3)$=$CH_2$ (n=2.0) (184 g), stearyl acrylate (23.1 g), glycerol monomethacrylate (4.3 g), glycidyl methacrylate (1.4 g), pure water (500 g), tripropylene glycol (79.4 g), alkyl trimethyl ammonium chloride (3.7 g), sorbitan monopalmitate (4.5 g), polyoxyethylene oleyl ether (4.5 g) and polyoxyethylene lauryl ether (18.0 g) were charged and emulsified by ultrasonic wave at 60° C. for 15 minutes with stirring. After the atmosphere of the autoclave was replaced with nitrogen gas, vinyl chloride (67 g) was injected. Then, 2,2'-azobis(2-amidinopropane) dihydrochloride (3.6 g) was added and the reaction was conducted at 60° C. for 5 hours to give an aqueous dispersion of a polymer.

Comparative Preparative Example 4

Into a 1 L autoclave, $CF_3CF_2$—$(CF_2CF_2)_n$—$CH_2CH_2OCOC(CH_3)$=$CH_2$ (n=2.0) (204 g), stearyl acrylate (25.6 g), N-methylol acrylamide (6.4 g), 3-chloro-2-hydroxypropyl methacrylate (1.5 g), pure water (486 g), tripropylene glycol (88 g), alkyl trimethyl ammonium chloride (3.4 g), sorbitan monopalmitate (4.6 g), polyoxyethylene oleyl ether (4.9 g) and polyoxyethylene lauryl ether (20.0 g) were charged and emulsified by ultrasonic wave at 60° C. for 15 minutes with stirring. After the atmosphere of the autoclave was replaced with nitrogen gas, vinyl chloride (67 g) was injected. Then, 2,2'-azobis(2-amidinopropane) dihydrochloride (2.2 g) was added and the reaction was conducted at 60° C. for 5 hours to give an intermediate aqueous dispersion of a polymer.

To the intermediate dispersion (15 g), added was amino-modified silicone oil (SF8417 manufactured by Dow Corning Toray Silicone Co., Ltd.) (0.23 g). The mixture was stirred for 1 hour to give an aqueous dispersion.

Comparative Preparative Example 5

Into a 1 L autoclave, $CF_3CF_2$—$(CF_2CF_2)_n$—$CH_2CH_2OCOC(CH_3)$=$CH_2$ (n=2.0) (204 g), stearyl acrylate (25.6 g), N-methylol acrylamide (6.4 g), 3-chloro-2-hydroxypropyl methacrylate (1.5 g), polydimethylsiloxane methacrylate (SILAPLANE FM0721 manufactured by Chisso Corp.) (31.5 g), pure water (486 g), tripropylene glycol (88 g), alkyl trimethyl ammonium chloride (3.4 g), sorbitan monopalmitate (4.6 g), polyoxyethylene oleyl ether (4.9 g) and polyoxyethylene lauryl ether (20.0 g) were charged and emulsified by wave at 60° C. for 15 minutes with stirring. After the atmosphere of the autoclave was replaced with nitrogen gas, vinyl chloride (67 g) was injected. Then, 2,2'-azobis(2-amidinopropane) dihydrochloride (2.2 g) was added and the reaction was conducted at 60° C. for 5 hours to give an aqueous dispersion of a polymer.

Comparative Preparative Example 6

Into a 1 L autoclave, $CF_3CF_2$—$(CF_2CF_2)_n$—$CH_2CH_2OCOC(CH_3)$=$CH_2$ (n=2.0) (184 g), stearyl acrylate (23.1 g), glycerol monomethacrylate (4.3 g), glycidyl methacrylate (1.4 g), Vinyl Siloxane 1 (28.4 g), pure water (500 g), tripropylene glycol (79.4 g), alkyl trimethyl ammonium chloride (3.7 g), sorbitan monopalmitate (4.5 g), polyoxyethylene oleyl ether (4.5 g) and polyoxyethylene lauryl ether (18.0 g) were charged and emulsified by ultrasonic wave at 60° C. for 15 minutes with stirring. After the atmosphere of the autoclave was replaced with nitrogen gas, vinyl chloride (67 g) was injected. Then, 2,2'-azobis(2-amidinopropane) dihydrochloride (3.6 g) was added and the reaction was conducted at 60° C. for 5 hours to give an aqueous dispersion of a polymer.

Example 1

The aqueous liquid (4.8 g) prepared by Preparative Example 1 was diluted with pure water to prepare a test solution (100 g). One sheet of a nylon test fabric (510 mm×205 mm) was immersed in this test solution, passed through a mangle, and treated in a pin tenter at 160° C. for 2 minutes. Then the test fabric was cut to give three thirds (each of which has a size of 170 mm×205 mm). Three thirds of fabric was used for non-washing, washing ten times and washing twenty times, respectively. The fabrics were subjected to the shower water-repellency test, the water-repellency test and the oil repellency test. The same procedure as in the above manner was repeated for one sheet of a PET test fabric (510 mm×205 mm) and one sheet of cotton test fabric (510 mm×205 mm). The results are shown in Table 4.

Examples 2 and 3

The polymer prepared by each of Preparative Examples 2 and 3 was processed as in Example 1 and then the shower water-repellency test, the water-repellency test and the oil repellency test were conducted. The results are shown in Table 4.

Comparative Examples 1 to 6

The polymer prepared by each of Comparative Preparative Examples 1 to 6 was processed as in Example 1 and then the shower water-repellency test, the water-repellency test and the oil repellency test were conducted. The results are shown in Table 4.

TABLE 4

| | | | Ex. 1 Pre. Ex. 1 | Ex. 2 Pre. Ex. 2 | Ex. 3 Pre. Ex. 3 | Com. Ex. 1 Com. Pre. Ex. 1 | Com. Ex. 2 Com. Pre. Ex. 2 | Com. Ex. 3 Com. Pre. Ex. 3 | Com. Ex. 4 Com. Pre. Ex. 5 | Com. Ex. 5 Com. Pre. Ex. 6 | Com. Ex. 6 Com. Pre. Ex. 7 |
|---|---|---|---|---|---|---|---|---|---|---|---|
| WR (spray) | Nylon | HL0 | 100 | 100 | 100 | 100 | 100 | 100 | 100 | 100 | 100 |
| | | HL10 | 80− | 70+ | 70+ | 80+ | 80+ | 90 | 70 | 70 | 70 |
| | | HL20 | 50 | 50 | 50 | 50 | 50 | 70 | 50 | 50 | 50 |
| | Polyester | HL0 | 100+ | 100+ | 100 | 100+ | 100+ | 100 | 100 | 100 | 100 |
| | | HL10 | 80+ | 80 | 80 | 100+ | 100+ | 100 | 70 | 70 | 80 |
| | | HL20 | 80 | 80 | 70 | 90 | 100+ | 80 | 50 | 50 | 70 |
| | Cotton | HL0 | 100 | 100 | 100 | 100 | 100 | 100 | 100 | 100 | 100 |
| | | HL10 | 80 | 80 | 80 | 80+ | 80 | 90 | 80 | 80 | 70 |
| | | HL20 | 70 | 70+ | 70+ | 80− | 80 | 90 | 70 | 70 | 70 |
| OR | Nylon | HL0 | 3 | 3 | 3 | 2 | 2 | 2 | 1 | 1 | 2 |
| | | HL10 | 1 | 1 | 0 | 1 | 2 | 1 | 0 | 0 | 2 |
| | | HL20 | 1 | 0 | 0 | 0 | 1 | 0 | 0 | 0 | 1 |

TABLE 4-continued

|  |  |  | Ex. 1 Pre. Ex. 1 | Ex. 2 Pre. Ex. 2 | Ex. 3 Pre. Ex. 3 | Com. Ex. 1 Com. Pre. Ex. 1 | Com. Ex. 2 Com. Pre. Ex. 2 | Com. Ex. 3 Com. Pre. Ex. 3 | Com. Ex. 4 Com. Pre. Ex. 5 | Com. Ex. 5 Com. Pre. Ex. 6 | Com. Ex. 6 Com. Pre. Ex. 7 |
|---|---|---|---|---|---|---|---|---|---|---|---|
|  | Polyester | HL0 | 6 | 6 | 6 | 5 | 5 | 5 | 3 | 3 | 5 |
|  |  | HL10 | 5 | 5 | 2 | 4 | 5 | 3 | 1 | 2 | 5 |
|  |  | HL20 | 4 | 3 | 2 | 4 | 4 | 2 | 1 | 1 | 4 |
|  | Cotton | HL0 | 6 | 6 | 6 | 6 | 6 | 5 | 3 | 3 | 6 |
|  |  | HL10 | 5 | 5 | 3 | 5 | 5 | 4 | 2 | 3 | 4 |
|  |  | HL20 | 4 | 4 | 4 | 5 | 5 | 4 | 1 | 2 | 3 |
| IPA/ | Nylon | HL0 | 3 | 3 | 2 | 3 | 3 | 1 | 1 | 1 | 3 |
| Water |  | HL10 | 4 | 4 | 3 | 3 | 2 | 1 | 1 | 1 | 2 |
|  |  | HL20 | 2 | 2 | 2 | 2 | 2 | 1 | 1 | 1 | 2 |
|  | Polyester | HL0 | 4 | 2 | 4 | 4 | 3 | 8 | 3 | 3 | 3 |
|  |  | HL10 | 6 | 3 | 3 | 6 | 5 | 8 | 2 | 3 | 4 |
|  |  | HL20 | 5 | 3 | 2 | 5 | 5 | 8 | 2 | 3 | 3 |
|  | Cotton | HL0 | 5 | 5 | 5 | 4 | 4 | 4 | 3 | 4 | 3 |
|  |  | HL10 | 5 | 5 | 4 | 5 | 5 | 4 | 2 | 3 | 2 |
|  |  | HL20 | 5 | 5 | 4 | 5 | 5 | 4 | 2 | 3 | 2 |
| Feeling |  |  | Very Good | Very Good | Very Good | Very Good | Very Good | Bad | Bad | Good | Good |

The invention claimed is:

1. A fluorine-containing polymer comprising repeating units derived from:
   (A) a monomer which comprises;
   (a) a fluorine-containing monomer of the formula:

$$CH_2=C(X)COOYRf,$$

wherein X is a hydrogen atom, a monovalent organic group, or a halogen atom,
   Y is a direct bond or a divalent organic group, and
   Rf is a fluoroalkyl group having 1 to 21 carbon atoms, and
   (B) a vinyl functional organopolysiloxane; wherein said vinyl functional organopolysiloxane (B) is a vinylamino functional organopolysiloxane comprising siloxy units having the average formula:

$$(R_2SiO)_a(RR^NSiO)_b(RR^VSiO)_c$$

wherein a is 0-4000, b is 1-1000, c is 2-1000,
   R is independently a monovalent organic group,
   $R^N$ is a monovalent amino functional organic group, and
   $R^V$ is a monovalent vinyl functional organic group.

2. The fluorine-containing polymer according to claim 1, wherein the monomer (A) further comprises:
   (b) a monomer which does not contain a fluorine atom, and
   (c) optionally present, a crosslinkable monomer,
   in addition to the fluorine-containing monomer (a).

3. The fluorine-containing polymer according to claim 1 wherein the fluorine-containing monomer (a) is a compound of the formula:

$$Rf-Y-O-\overset{O}{\underset{\|}{C}}-\overset{X}{\underset{|}{C}}=CH_2 \qquad (I)$$

wherein X is a hydrogen atom, a linear or branched alkyl group having 1 to 21 carbon atoms, a halogen atom, a cyano group, a linear or branched fluoroalkyl group having 1 to 21 carbon atoms, a substituted or unsubstituted benzyl group, a substituted or unsubstituted phenyl group, or a $CFX^1X^2$ group,
   wherein $X^1$ and $X^2$ is a hydrogen atom or a halogen atom,
   Y is a direct bond,
   an aliphatic group having 1 to 10 carbon atoms,
   an aromatic or cycloaliphatic group having 6 to 10 carbon atoms,
   a $-CH_2CH_2N(R^1)SO_2-$ group,
   wherein $R^1$ is an alkyl group having 1 to 4 carbon atoms, or
   $-CH_2CH(OY^1)CH_2-$ group,
   wherein $Y^1$ is a hydrogen atom or an acetyl group, and
   Rf is a linear or branched fluoroalkyl group having 1 to 21 carbon atoms.

4. The fluorine-containing polymer according to claim 2, wherein the fluorine-free monomer (b) is an acrylate of the general formula:

$$CH_2=CA^1COOA^2$$

wherein $A^1$ is a hydrogen atom, a methyl group, or a halogen atom other than a fluorine atom, and $A^2$ is an alkyl group represented by $C_nH_{2n+1}$ (n=1 to 30).

5. The fluorine-containing polymer according to claim 2, wherein the crosslinkable monomer (c) is a fluorine-free monomer having at least two reactive groups and/or carbon-carbon double bonds.

6. The fluorine-containing polymer according to claim 2, wherein the crosslinkable monomer (c) is fluorine-free.

7. The fluorine-containing polymer according to claim 1, wherein X is chlorine.

8. The fluorine-containing polymer according to claim 1, wherein the vinylamino functional organopolysiloxane has the average formula:

$$R'O(SiMe_2O)_a(SiMeO)_b(SiMeO)_cR'$$
$$\underset{(CH_2)_3NH_2}{\overset{CH=CH_2}{|}}$$

where a is 0-4000, b is 1-1000, c is 2-1000, and
   R' each is, the different or the same, H, an alkyl group having 1 to 40 carbon atoms, or $Me_3Si$.

9. A method of producing a fluorine-containing polymer comprising polymerizing:
   (A) a monomer which comprises;
   (a) a fluorine-containing monomer of the formula:

$$CH_2=C(X)COOYRf,$$

wherein X is a hydrogen atom, a monovalent organic group, or a halogen atom,

Y is a direct bond or a divalent organic group, and

Rf is a fluoroalkyl group having 1 to 21 carbon atoms, in the presence of;

(B) a vinyl functional organopolysiloxane; wherein said vinyl functional organopolysiloxane (B) is a vinylamino functional organopolysiloxane comprising siloxy units having the average formula:

$$(R_2SiO)_a(RR^NSiO)_b(RR^VSiO)_c$$

wherein a is 0-4000, b is 1-1000, c is 2-1000,

R is independently a monovalent organic group, $R^N$ is a monovalent amino functional organic group, and $R^V$ is a monovalent vinyl functional organic group.

10. The method according to claim 9, wherein the fluorine-containing monomer is a compound of the formula:

$$\text{Rf—Y—O—}\overset{\displaystyle O}{\overset{\displaystyle \|}{C}}\text{—}\overset{\displaystyle X}{\overset{\displaystyle |}{C}}\text{=CH}_2 \quad (I)$$

wherein X is a hydrogen atom, a linear or branched alkyl group having 1 to 21 carbon atoms, a halogen atom, a cyano group, a linear or branched fluoroalkyl group having 1 to 21 carbon atoms, a substituted or unsubstituted benzyl group, a substituted or unsubstituted phenyl group, or a $CFX^1X^2$ group, wherein $X^1$ and $X^2$ is a hydrogen atom or a halogen atom, Y is a direct bond, an aliphatic group having 1 to 10 carbon atoms, an aromatic or cycloaliphatic group having 6 to 10 carbon atoms, a —$CH_2CH_2N(R^1)SO_2$— group, wherein $R^1$ is an alkyl group having 1 to 4 carbon atoms, or —$CH_2CH(OY^1)CH_2$— group, wherein $Y^1$ is a hydrogen atom or an acetyl group, and Rf is a linear or branched fluoroalkyl group having 1 to 21 carbon atoms.

11. The method according to claim 9, wherein the vinylaminofunctional organopolysiloxane has the average formula:

$$R'O(SiMe_2O)_a(SiMeO)_b(SiMeO)_cR'$$
with $CH=CH_2$ and $(CH_2)_3NH_2$ substituents where a is 0-4000, b is 1-1000, c is 2-1000, and R' each is, the different or the same, H, an alkyl group having 1 to 40 carbon atoms, or $Me_3Si$.

12. The method according to claim 9, wherein the monomer (A) further comprises:

(b) a fluorine-free monomer, and (c) optionally present, a crosslinkable monomer, in addition to (a) the fluorine-containing monomer.

13. The method according to claim 12, wherein the fluorine-free monomer (b) is an acrylate of the general formula:

$$CH_2=CA^1COOA^2$$

wherein $A^1$ is a hydrogen atom, a methyl group or a halogen atom other than a fluorine atom, and $A^2$ is a hydrocarbon group having 1 to 30 carbon atoms, particularly an alkyl group represented by $C_nH_{2n+1}$ (n=1 to 30).

14. The method according to claim 12, wherein the crosslinkable monomer (c) is a monomer having at least two reactive groups, a monomer having least two carbon-carbon double bonds, or a monomer having at least one carbon-carbon double bond and at least one reactive group.

15. The method according to claim 12, wherein the crosslinkable monomer (c) is fluorine-free.

16. The method according to claim 9, wherein X is chlorine.

17. The method according to claim 9, wherein 5 to 99.9 weight % of the monomer (A), and 0.1 to 95 weight % of the vinyl functional organopolysiloxane (B), are used in the method providing that sum of (A) and (B) equals 100%.

18. The fluorine-containing polymer prepared according to the method of claim 9.

* * * * *